(12) United States Patent
Hassani et al.

(10) Patent No.: US 11,752,974 B2
(45) Date of Patent: Sep. 12, 2023

(54) SYSTEMS AND METHODS FOR HEAD POSITION INTERPOLATION FOR USER TRACKING

(71) Applicant: Ford Global Technologies, LLC, Dearborn, MI (US)

(72) Inventors: Ali Hassani, Ann Arbor, MI (US); Ryan Hanson, Livonia, MI (US); Lawrence Chikeziri Amadi, Chicago, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/118,977

(22) Filed: Dec. 11, 2020

(65) Prior Publication Data

US 2022/0185233 A1 Jun. 16, 2022

(51) Int. Cl.
 *B60R 25/25* (2013.01)
 *G07C 9/00* (2020.01)
 *G06V 40/16* (2022.01)

(52) U.S. Cl.
 CPC ............ *B60R 25/25* (2013.01); *G06V 40/169* (2022.01); *G06V 40/172* (2022.01); *G07C 9/00563* (2013.01)

(58) Field of Classification Search
 CPC .... B60R 25/25; G06V 40/169; G06V 40/172; G06V 20/56; G06V 40/12; G06V 40/168; G06V 40/25; G07C 9/00563
 See application file for complete search history.

(56) References Cited

U.S. PATENT DOCUMENTS

| | | | |
|---|---|---|---|
| 7,110,570 B1 | 9/2006 | Berenz et al. | |
| 8,599,266 B2 | 12/2013 | Trivedi et al. | |
| 2002/0152010 A1* | 10/2002 | Colmenarez | G06K 9/6293 340/426.1 |
| 2013/0249669 A1* | 9/2013 | Zwiener | B60R 25/2045 340/5.53 |
| 2016/0300410 A1* | 10/2016 | Jones | B60R 25/2045 |
| 2016/0379074 A1 | 12/2016 | Nielsen et al. | |
| 2017/0106875 A1* | 4/2017 | Yamasaki | B60R 16/037 |
| 2021/0221329 A1* | 7/2021 | Mueller | G07C 9/00309 |

OTHER PUBLICATIONS

Chen, et al, "Moving Human Full-Body and Body-Parts Detection, Tracking, and Applications on Human Activity Estimation, Walking Pattern and Face Recognition", Automatic Target Recognition, Proc. of SPIE, vol. 9844, 98440T-1, May 2016, 35 pages.

Suchitra et al, "An Efficient Multiple Object Recognition using Gait Feature Extraction based on Gaussian Filter", International Journal of Recent Technology and Engineering (IJRTE), ISSN: 2277-3878, vol. 8, Issue May 1, 2019, 7 pages.

* cited by examiner

Primary Examiner — Abhishek Sarma
(74) Attorney, Agent, or Firm — Frank Lollo; Eversheds Sutherland (US) LLP

(57) ABSTRACT

A method for maintaining tracking using non-identifiable biometrics includes determining, via a computer vision system, an identity of a user using a set of facial features, associating the set of facial features with a head and a secondary human landmark that does not include the set of facial features, and determining that the set of facial features is unlocatable by a computer vision system. The method includes tracking the user, via the computer vision system, using the head and the secondary human landmark.

17 Claims, 6 Drawing Sheets

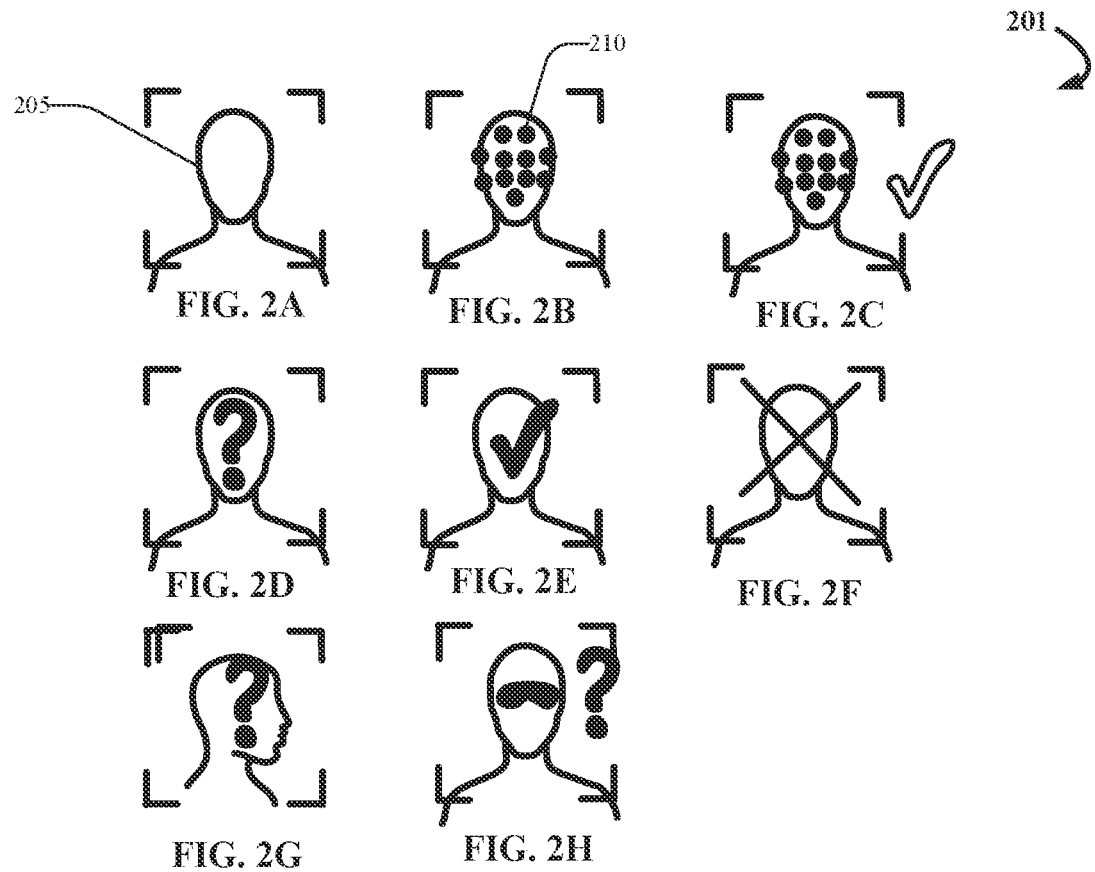

SYSTEMS AND METHODS FOR HEAD POSITION INTERPOLATION FOR USER TRACKING

BACKGROUND

One feature offered on passive key fob and phone-as-a-key (PaaK) systems is a vehicle welcome mode. Using a device location, the vehicle greets a user when the user has entered a detection zone within a certain displacement from the vehicle skin. Vision based biometrics, such as Face Recognition (FR), can enable similar functionality when the user is tracked using a perception system on the vehicle. Using vision processing techniques, it is possible to get an estimation of position with relative accuracy within the linear portion of the camera lens utilized in the vehicle perception system.

Challenges in continuous tracking of the same individual may occur when the subject turns her/his head or torso, which may obscure biometric markers used to continuously track and authenticate the facial features of the subject. A head turn beyond approximately 30 degrees from line of sight to the perception system camera can increase complexity of biometric recognition detection. This can result in a loss of the user position tracking process, an increased latency in user facial feature detection, and increased off load due to additional required vision computations by the system. Moreover, after the user head turn causes a gap in the continuous tracking process, the vehicle welcome mode timer may have to restart each time the user has turned her/his head, which may decrease usefulness of the welcome features.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 2A to 2H illustrate facial recognition scenarios described in accordance with the present disclosure.

DETAILED DESCRIPTION

Overview

Figure 1:
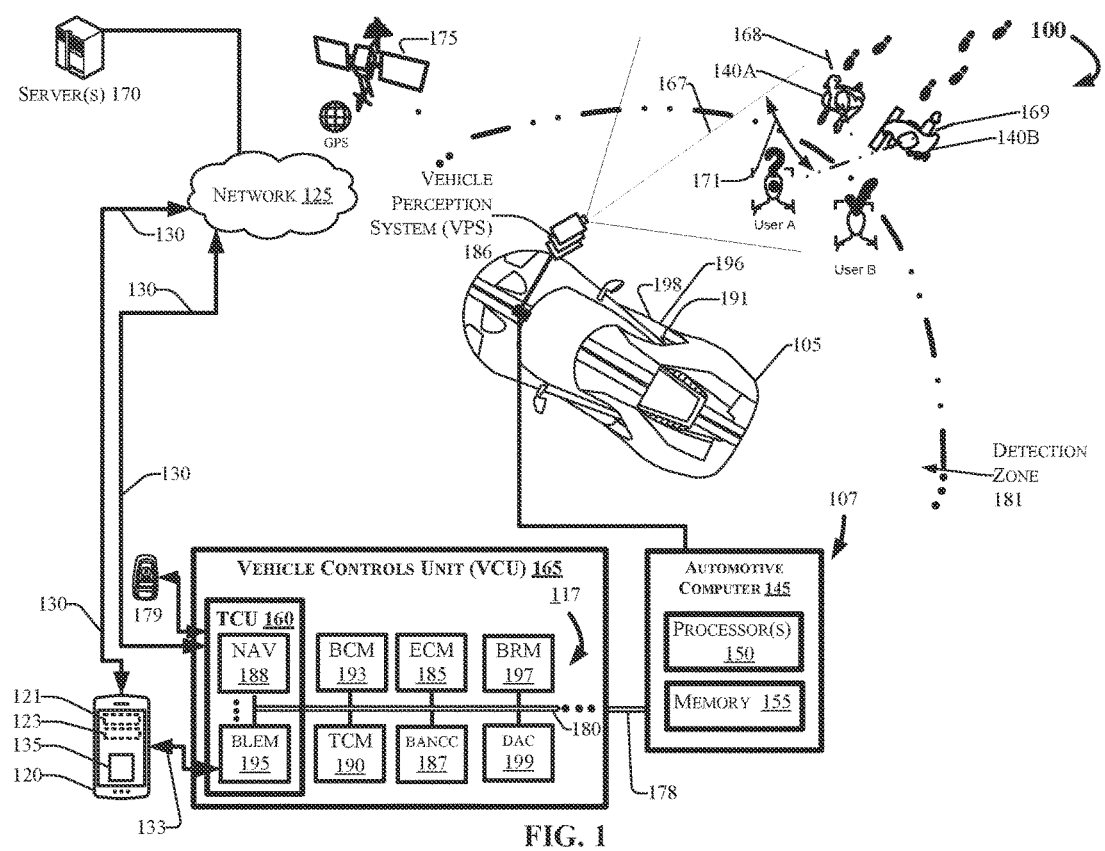
FIG. 1 depicts an example computing environment in which techniques and structures for providing the systems and methods disclosed herein may be implemented.

In some embodiments, a biometric recognition module may interpolate between head turns or other user positions to reduce facial recognition latency and optimize position tracking of subject facial features. After authenticating the subject, a biometric recognition module may continuously track a position of the subject using other elements of the body that are more agnostic to camera field of vision, such as the head and upper body.

The biometric recognition module may rely on a last known associated identification (ID) of the user until a clear frontal view of the user's face returns to the image frame. This enables more precise tracking of the user, reduces latency, and also reduces computational load needed to authenticate the user over a period of time using facial recognition (FR), when the user may be positioned at odd angles relative to the camera field of vision. Performing this process can include sampling an image frame of the user's face when the user's head is within a nominal field of vision with respect to a vehicle perception system. The biometric recognition module characterizes facial characteristics from the image frame to authenticate the user, then temporarily stores the sampled facial image in a secure memory, including a user ID associated with the authenticated user, and a location of the authenticated body portion in the sampled image plane. When the head turns beyond the nominal range, or becomes indistinguishable by the biometric recognition module, the system may interpolate the head turn by tracking the head associated with the previously-authenticated face, and a secondary human characteristic, which may be a body part, an object, clothing design, or other possible identifiers. The biometric recognition module may continue the interpolation until either the head and secondary human body characteristic are no longer detectable or until the head returns to a nominal angle. Upon nominal return, facial recognition would resume and update the stored value accordingly.

The secondary human landmark can include a position of a visible body part or joints, a word or phrase displayed on the subject's clothing, or distinct belongings in the image frame that may be carried by the subject, like a purse, a package, a bag, or another object. Methods for tracking these human landmarks may include blob detection and contour analysis of the head, Haar cascade detection of bodies, 2-D and 3-D human pose estimation for tracking motion of skeletal figures, and optical flow using Kalman filters to predict the position changes.

The biometric recognition module may further utilize gait recognition to provide supplemental information that provides indicia of user intention. The gait recognition information may characterize the walking pace and trajectory of the user as they approach or walk away from the vehicle, which can increase confidence as to whether the user is intending on approaching the vehicle for access (and/or leaving the vehicle). The system may calculate the gait using the vehicle perception system associated with the biometric recognition module, and computer vision tools that track human skeletal (body parts and joints) motion. When utilized with a vehicle, the biometric recognition module may determine the user's gait, which may optimize key off load by only engaging greeting features (Welcome Mode, etc.) when the intent confidence score exceeds a threshold.

These and other advantages of the present disclosure are provided in greater detail herein.

ILLUSTRATIVE EMBODIMENTS

The disclosure will be described more fully hereinafter with reference to the accompanying drawings, in which example embodiments of the disclosure are shown, and not intended to be limiting.

Many vehicles include a Phone-as-a-Key (PaaK) feature that sets the vehicle in a Welcome Mode when the passive key device is within the detection zone of the vehicle. Based off a relatively precise location of the device, a vehicle in Welcome Mode may greet the user once they are within a certain displacement from the vehicle skin (e.g., within the detection zone).

Vision based biometrics, such as Face Recognition (FR), have the capability to enable similar functionality when the user is properly tracked. Using vision processing techniques, it is possible to get an estimation of position with relative accuracy within the linear portion of the lens. Challenges, however, occur when dealing with head turns. When the user turns their head beyond approximately 30 degrees from straight ahead with respect to the camera angle, the complexity of landmark detection increases significantly, and eventually will become impossible given enough rotational displacement. Conventional systems may lose position tracking, and experience increased latency for the face identification steps. Moreover, conventional face detection systems may experience increased key off load due to extra vision computations, as well as restarting Welcome Mode each time the head is turned past the 30-degree angle.

FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145 and a biometric recognition system 107. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques. The mobile device 120 may be configured and/or programmed as a passive key device associated with a Phone-as-a-Key (PaaK) vehicle key system.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a performance vehicle, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., level-5 autonomy) or in one or more partial autonomy modes. Examples of partial autonomy modes are widely understood in the art as autonomy Levels 0 through 5. A vehicle having a Level-0 autonomous automation may not include autonomous driving features. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the biometric recognition system 107 may be configured and/or programmed to operate with a vehicle having a Level-0 through Level-5 autonomous vehicle controller. Accordingly, the biometric recognition system 107 may provide some aspects of human control to the vehicle 105, when the vehicle is configured as an AV.

The mobile device 120 generally includes a memory 123 for storing program instructions associated with an application 135 that, when executed by a mobile device processor 121, performs aspects of the disclosed embodiments. The application (or "app") 135 may be part of the biometric recognition system 107, or may provide information to the biometric recognition system 107 and/or receive information from the biometric recognition system 107.

In some aspects, the mobile device 120 may communicate with the vehicle 105 through the one or more wireless channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and via one or more direct connection(s) 133. The wireless channel(s) 133 may include various low-energy protocols including, for example, Bluetooth®, BLE, or other Near Field Communication (NFC) protocols.

The network(s) 125 illustrate an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the biometric recognition system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a biometric recognition program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and Network Communication Controller (BANCC) 187, etc. In some aspects, the VCU 165 may control aspects of the vehicle 105, and implement one or more instruction sets received from the application 135 operating on the mobile device 120, from one or more instruction sets received from the biometric recognition system 107, and/or from instructions received from an AV controller (not shown in FIG. 1).

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the fob 179).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the biometric recognition system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the biometric recognition system 107, and/or via wireless signal inputs received via the wireless channel(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless channel(s) 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

In some aspects, the vehicle 105 may include one or more Door Access Panels (DAPs) disposed on exterior door surface(s) of vehicle door(s) 198, and connected with a DAP controller (not shown in FIG. 1). In some aspects, the user 140 may have the option of entering a vehicle by typing in a personal identification number (PIN) on an exterior interface associated with a vehicle. The user interface may be included as part of a Door Access Panel (DAP) interface, a wireless keypad, mobile device, or other interface. The DAP system, which may be included as part of the BANCC 187 or another of the ECUs 117, can include and/or connect with an interface with which a ridehail passenger, user, (or any other user such as the user 140) may input identification credentials and receive information from the system. In one aspect, the interface may be or include a DAP 191 disposed on a vehicle door 198, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the interface may alternatively be one or more other types of interfaces described above.

Figure 5:
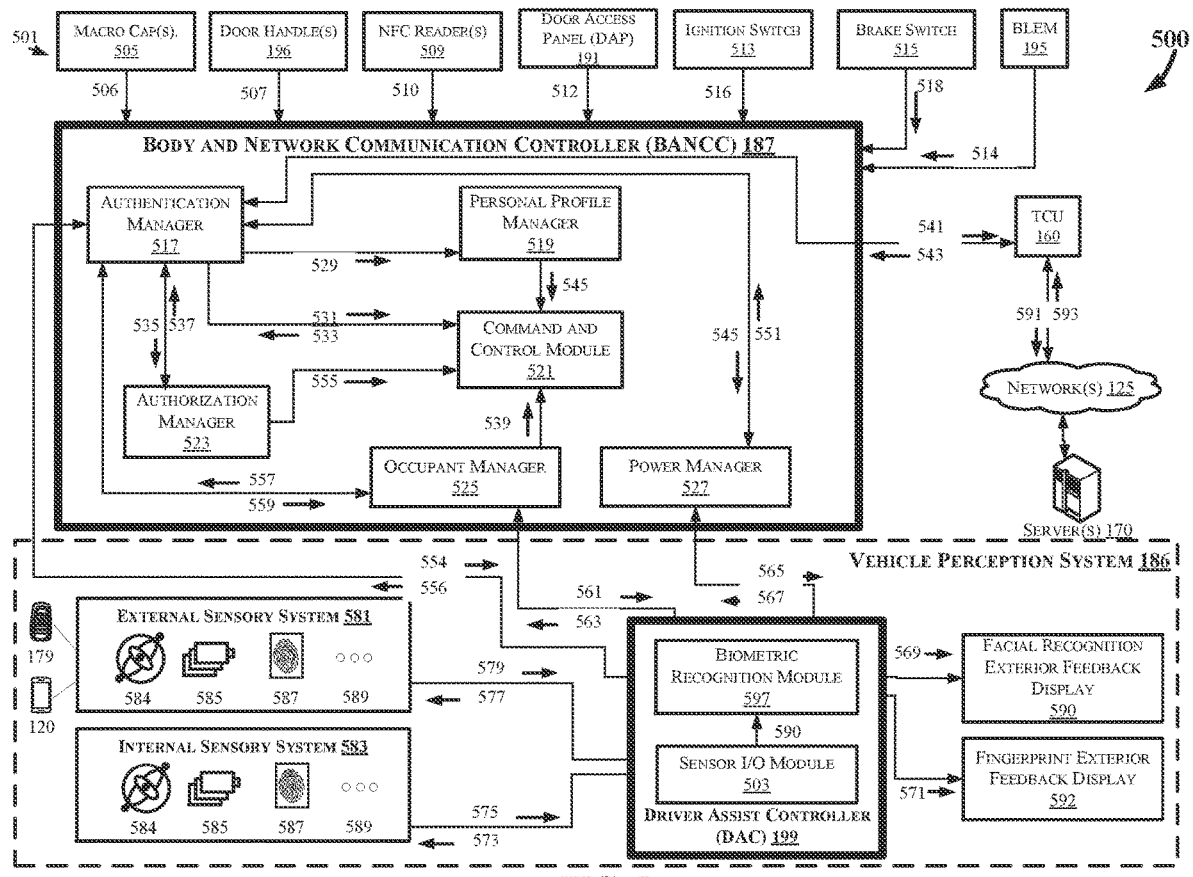
FIG. 5 illustrates a functional schematic and example architecture for a vehicle biometric authentication and occupant monitoring system in accordance with the present disclosure.

The BANCC 187, described in greater detail with respect to FIG. 5, can include sensory and processor functionality and hardware to facilitate user and device authentication, and provide occupant customizations and support that provide customized experiences for vehicle occupants.

The BANCC 187 may connect with a Driver Assist Controller (DAC) 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc. The VCU 165 may, in some example embodiments, utilize the DAC 199 to obtain sensor information from sensors disposed on the vehicle interior and/or exterior (sensors not shown in FIG. 1), and characterize the sensor information for identification of biometric markers stored in a secure biometric data vault (not shown in FIG. 1) onboard the vehicle 105 and/or via the server(s) 170. In other aspects, the DAC 199 may also be configured and/or programmed to control Level-1 and/or Level-2 driver assistance when the vehicle 105 includes Level-1 or Level-2 autonomous vehicle driving features. The DAC 199 may connect with and/or include a Vehicle Perception System (VPS) 186, which may include internal and external sensory systems (described in greater detail with respect to FIG. 5). The sensory systems may be configured and/or programmed to obtain sensor data usable for biometric authentication. Although the vehicle perception system 186 is depicted as having sensors at a single location, it should be appreciated that the vehicle 105 may include sensors disposed at multiple locations on the exterior and interior of the vehicle.

The processor(s) 150 may also provide access to the vehicle 105 in conjunction with the secure processor(s) 150 by unlocking the door 198, based on the key-on request and/or the authentication message (key-on request and authentication message not shown in FIG. 1) stored in the cache memory of the automotive computer 145. The secure processor initialization instruction may initialize the secure processor(s) 150, by sending instructions that "wake up" the secure processor(s) 150 by changing a power mode profile from a low-energy state to a higher-energy state. Once initialized, the secure processor(s) 150 may verify the authentication message (not shown in FIG. 1) stored in the cache memory of the automotive computer 145 before unlocking the door 198. The processor(s) 150 may further provide vehicle access based on biometric identification features, according to embodiments of the present disclosure.

Aspects of the present disclosure also include approach detection-based features, such as a vehicle Welcome Mode, a vehicle Approach Unlock Mode, among other possible features. As shown in FIG. 1, the users 140 are depicted approaching the vehicle 105, where the user 140A has her head turned toward the user 140B. In one aspect, the angle 168 of the user 140A's head turn may obscure facial landmarks used to identify that individual. On the other hand, the user 140B may have unobscured facial features with respect to the VPS aspect angle 167, where the relative difference of the head turn angle 169 is small with respect to the VPS aspect angle 167.

In the example depicted in FIG. 1, the user 140B's identity may be ascertained by the biometric recognition system 107. The biometric recognition system 107 may perform head tracking interpolation based on the security requirements of the respective feature. However, positive identity tracking throughout the entire duration of the users' 140A and 140B proximity to the vehicle 105 may change if, for example, the user 140B were to turn around facing away from the vehicle 105. In some aspects, vehicle features may be associated with relative risk associated with obtaining positive identity. For example, personalization and greeting features may not require increased security controls, where an initial authentication of facial features may be sufficient to provide or enable the personalization or greeting. In this example, the user 140B may be authenticated, thus, even if the identity tracking is briefly lost, the VCU 165 may consider the interpolated recognized ID (e.g., the initial authentication using the observed facial recognition) may be sufficient to enable the vehicle Welcome Mode messages, lighting actuation, etc. For security-based features, such as Approach Unlock and Passive Entry, the VCU 165 may require a real-time facial recognition procedure described in greater detail hereafter. Feedback may be provided through vehicle external lighting or a dedicated biometric feedback system to identify when the user's face is considered valid for authentication.

Tracking may involve a local region of interest, such that only the expected locations of the image are searched for the face (reduced computational load). This may also include downsampling when just doing face tracking for personalization to further reduce computation The computing system architecture of the automotive computer 145, VCU 165, the VPS 186, and/or the biometric recognition system 107 described with respect to FIG. 1 may omit certain computing modules. It should be readily understood that the computing environment depicted in FIG. 1 is an example of one implementation according to the present disclosure, and thus, it should not be considered limiting or exclusive.

FIGS. 2A, 2B, 2C, 2D, 2E, 2F, 2G, and 2H illustrate various facial recognition scenarios, in accordance with the present disclosure. FIG. 2A illustrates a subject 201 that may be in the viewing frame of an image obtained by the VPS 186. The subject generally includes a head 205. FIG. 2B illustrates a set of facial features 210 that may be associated with a unique identity profile of a user (e.g., the users 140A and 140B depicted in FIG. 1). Although outside of the scope of the present disclosure, those skilled in the art of facial recognition systems understand that facial recognition may include any number of human landmarks including, for example, facial landmark identifiers. FIG. 2C illustrates an identity of a user using the set of facial features 210, where the features were observable in the normal field of vision for the VPS 186. Similarly, facial recognition algorithms may also be programmed and/or configured to recognize secondary characteristics, such as non-facial features, objects, and spatial relationships between any of the recognized features and objects.

As shown in FIG. 2D, when the set of facial features 210 are obscured subsequent to the identity authentication of FIG. 2C, the continuous identity chain may be broken such that the positive identity of the subject is unknown.

In some aspects, once the subject returns to an observable head turn angle such that the facial features 210 are again observable by the biometric recognition system 107, the system may reauthenticate the subject's identity, as shown in FIG. 2E.

In other aspects, the biometric recognition system 107 may determine that the subject has not been reauthenticated, as shown in FIG. 2F. This scenario may arise in many ways, such as when a group of individuals approaches the vehicle 105, and where one or more of the individuals is an authorized user, but turns in such a way as to obscure the set of facial features used to positively identify the authorized user. If the vehicle 105 locks on to another individual in the group (having a separate and non-authenticated set of facial features), that individual is not authenticated as shown in FIG. 2F. The user position tracking may also be interrupted or lost responsive to a head turn (FIG. 2G), or by obscuring facial features with glasses or other items of clothing (FIG. 2H), etc.

In some aspects, to resolve interruptions or loss of user position tracking, the biometric recognition system 107 may interpolate face images by forming associations with other readily resolvable secondary human landmarks. FIGS. 3A, 3B, 3C, 3D, and 3E depict aspects of interpolation using various secondary human landmarks, in accordance with the present disclosure.

Figure 3A:
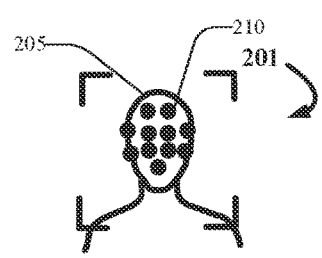
FIGS. 3A to 3F depict aspects of interpolation using secondary features in accordance with the present disclosure.
Figure 3B:
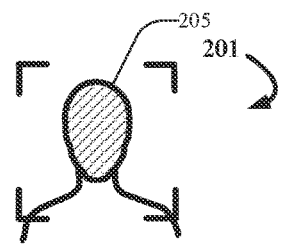
Figure 3C:
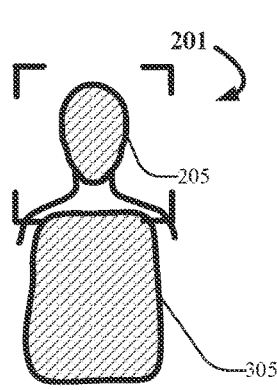
Figure 3D:
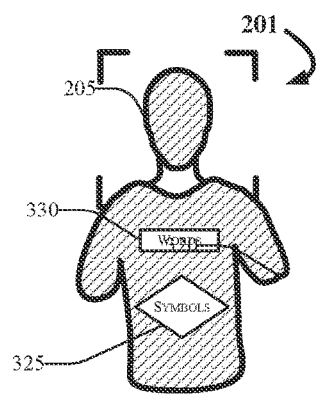
Figure 3E:
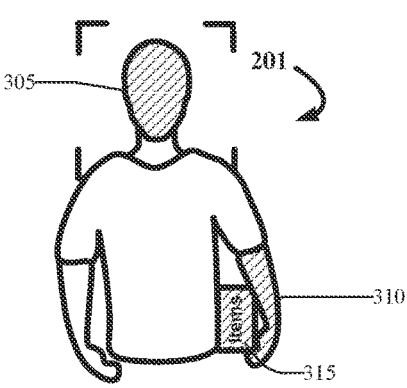
Figure 3F:
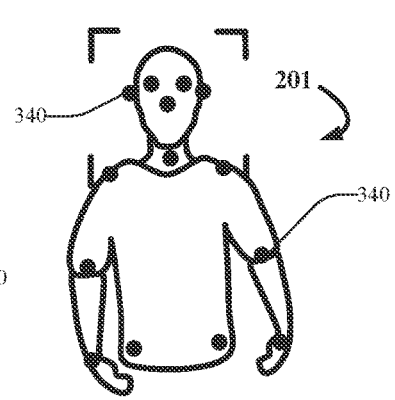

FIG. 3A shows the set of facial features 210 observed in an image frame of the subject 201. Each time the subject's head 205 is within a nominal field of vision for the VPS 186 (shown in FIG. 1), the biometric recognition system 107 can temporarily store a last valid sampled facial image that includes the set of facial features 210. The system 107 may authenticate the subject 201 by matching the set of facial features 210 with securely-stored biometric comparison data (not shown in FIG. 3), identify a recognized user ID, and store the recognized user ID in a computer memory (e.g., the memory 155 depicted in FIG. 1). The system 107 may update a human landmark tracking index with the recognized user ID, a frame location indicative of a relative position in the image plane for the set of facial features 210 in the last sampled image, and a frame location indicative of a relative position in the image plane for a secondary human landmark. The secondary human landmark may include a torso 305, as depicted in FIG. 3C, a visible body part 310 as shown in FIG. 3E, an item of clothing 320 as shown in FIG. 3D, a package or other item 315 carried by the user as shown in FIG. 3E, one or more keypoints 340 that are assigned to and associated with the body of the user, for example, points associated with the eyes, ears, neck, shoulders, elbows, wrists or waist or the user, including identification of the relationship between and relative spacing of those keypoints 340, or another processor-identifiable object or feature not listed here.

According to an embodiment, when the user 140 may turn their head beyond a nominal range (e.g., up to 30 degrees with respect to a central viewing angle of the VPS camera, up to 25 degrees, up to 40 degrees, or some other nominal threshold), the biometric recognition system 107 may interpolate using the human landmark tracking index, by tracking the recognized user ID and associated head 205 and secondary human landmark. Other landmarks such as position of visible body parts/joints, wording on clothing 330, symbols on clothing 325, or other distinct belongings and items like a purse could also be used as supplemental data.

In some aspects, the system 107 may continue the interpolation until either the head secondary human landmark is no longer detectable, or until the head returns to a nominal angle, thus providing a clear view of the set of facial features 210.

Tracking a position with respect to the image frame may be done in various known ways. To list a few, the biometric recognition system 107 may estimate where a blob of pixels is located (that is, a predicted location based on a trajectory factor, a time factor, a threshold for error, weight factors, etc.). The processor(s) 150 may perform a contour analysis of the head 205 to define the ovaloid contour representing the subject's head 205, and utilize optical flow techniques using a Kalman filter to predict the position changes. In other aspects, a Haar cascade detection technique may be utilized to detect the secondary human landmarks described herein, and/or utilize 2D and 3D human pose estimation techniques for tracking motion of the subject 201. Other techniques are possible, and such techniques are contemplated for performing these steps.

Figure 4:
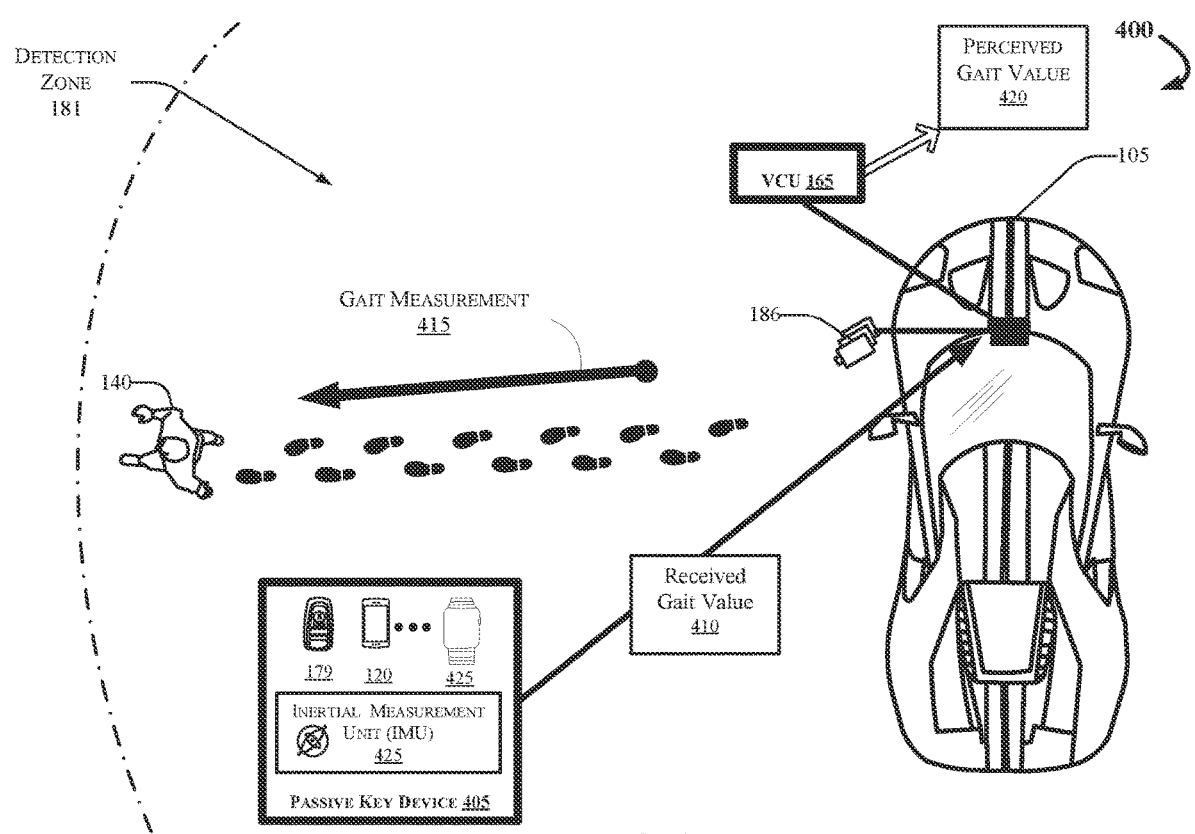
FIG. 4 illustrates an example automotive control system programmed to provide head tracking interpolation in accordance with the present disclosure.

In some aspects, it may be advantageous to provide additional information that increases security for vehicle access and operation. FIG. 4 illustrates an example automotive control system programmed to provide gait tracking that may be used with the head tracking interpolation described in accordance with the present disclosure.

FIG. 4 depicts an example operating environment, where the user 140 walks away from the vehicle 105, in accordance with an example embodiment. In some aspects, a Biometric Authentication and Occupant Monitoring System 500 (described in greater detail with respect to FIG. 5) may perform steps to determine user intent by identifying and characterizing user gait as the user 140 approaches or walks away from the vehicle 105. In some aspects, the user 140 may carry a passive key device 405. According to embodiments described herein, the pace of travel for the user 140 as she/he approaches or walks away from the vehicle 105 may be characterized as a value with respect to time. In other aspects, the vehicle 105 may perform the gait measurements, and/or the occupant monitoring system 500 may determine the gait using a combination of both measurements to determine the user's intent. The system 500 may calculate the perceived gait value 420 using vision methods for tracking human skeletal (body parts and joints) motion. This step may optimize key off load by only engaging greeting features (Welcome Mode, etc.) when the intent confidence score exceeds a threshold.

In one example embodiment, the biometric recognition system 107 may utilize gait recognition to add extra confidence as to whether the user 140 intends to approach the vehicle 105 to gain access. The system 400 may calculate the perceived gait value 420 using one or more known computer vision methods for tracking human skeletal (body parts and joints) motion, where the gait measurement 415 could help optimize key off load by only engaging greeting features (Welcome Mode, etc.) when the intent confidence score exceeds a threshold.

In another aspect, the system 400 may utilize gait recognition to increase confidence (that is, increase an estimated probability) as to whether the user 140 intends to leave the vehicle 105, or whether the user 140 is merely meandering nearby. For example, if the user 140 simply stepped outside for fresh air or to take a photo, the system 400 may include a meandering detection mode that identifies the user's intent is to eventually return to the vehicle 105. In this fashion, the system 400 may utilize gait based intent recognition to add extra confidence as to when the vehicle 105 should engage a lock. This approach could also be reversed to always engage a lock when meandering is detected, and then only re-unlock once the user is directly in front of the vehicle door for security.

In one example embodiment, the system 400 may trigger a vehicle lock (not shown in FIG. 4) to actuate to a locked state or an unlocked state based on the user's gait. In another aspect, the system may determine, based on the gait, that the user is walking away from the vehicle, and responsive to determining that the user is walking away from the vehicle, trigger the vehicle lock to actuate to the locked state.

FIG. 5 illustrates a functional schematic of an example architecture of a biometric authentication and occupant monitoring system 500 that may be used for providing vehicle entry and signal authentication using biometric information and other human factors, and for providing user support and customization for the vehicle 105, in accordance with the present disclosure.

The biometric authentication and occupant monitoring system 500 may authenticate passive device signals from a passive entry passive start (PEPS)-configured device such as the mobile device 120, a passive key device such as the fob 179, and provide vehicle entry and signal authentication using biometric information and other human factors. The biometric and occupant monitoring system 500 may also provide user support and customizations to enhance user experience with the vehicle 105. The authentication and occupant monitoring system 500 can include the BANCC 187, which may be disposed in communication with the DAC 199, the TCU 160, the BLEM 195, and a plurality of other vehicle controllers 501, which may include vehicle sensors, input devices, and mechanisms. Examples of the plurality of other vehicle controllers 501 can include, the vehicle perception system 186, one or more macro capacitor(s) 505 that may send vehicle wakeup data 506, the door handle(s) 196 that may send PEPS wakeup data 507, NFC reader(s) 509 that send NFC wakeup data 510, the DAPs 191 that send DAP wakeup data 512, an ignition switch 513 that can send an ignition switch actuation signal 516, and/or a brake switch 515 that may send a brake switch confirmation signal 518, among other possible components.

The DAC 199 may include and/or connect with a biometric recognition module 597 disposed in communication with the DAC 199 via a sensor Input/Output (I/O) module 503. The BANCC 187 may connect with the DAC 199 to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAC 199 may be configured and/or programmed to provide biometric authentication control for the vehicle 105, including, for example, facial recognition, fingerprint recognition, voice recognition, and/or other provide authenticating information associated with characterization, identification, occupant appearance, occupant status, and/or verification for other human factors such as gait recognition, body heat signatures, eye tracking, etc. The DAC 199 may obtain the sensor information from an external sensory system 581, which may include sensors disposed on vehicle exterior and in devices connectable with the vehicle 105 such as the mobile device 120 and/or the fob 179.

The DAC 199 may further connect with an internal sensory system 581, which may include any number of sensors configured in the vehicle interior (e.g., the vehicle cabin, which is not depicted in FIG. 5). The external sensory system 581 and internal sensory system 583 can connect with and/or include one or more inertial measurement units (IMUs) 584, camera sensor(s) 585, fingerprint sensor(s) 587, and/or other sensor(s) 589, and obtain biometric data usable for characterization of the sensor information for identification of biometric markers stored in a secure biometric data vault (not shown in FIG. 5) onboard the vehicle 105. The DAC 199 may obtain, from the internal and external sensory systems 583 and 581, sensor data that can include external sensor response signal(s) 579 and internal sensor response signal(s) 575 (collectively referred to as sensory data), via the sensor I/O module 503. The DAC 199 (and more particularly, the biometric recognition module 597) may characterize the sensory data 579 and 575, and generate occupant appearance and status information 590, which may be used by the BANCC 187 according to described embodiments.

The internal and external sensory systems 583 and 581 may provide the sensory data 579 obtained from the external sensory system 581 and the sensory data 575 from the internal sensory system 583 responsive to an internal sensor request message 573 and an external sensor request message 577, respectively. The sensory data 579 and 575 may include information from any of the sensors 584-589, where the external sensor request message 577 and/or the internal sensor request message 573 can include the sensor modality with which the respective sensor system(s) are to obtain the sensory data.

The camera sensor(s) 585 may include thermal cameras, optical cameras, and/or a hybrid camera having optical, thermal, or other sensing capabilities. Thermal cameras may provide thermal information of objects within a frame of view of the camera(s), including, for example, a heat map figure of a subject in the camera frame. An optical camera may provide a color and/or black-and-white image data of the subject(s) within the camera frame. The camera sensor(s) 585 may further include static imaging, or provide a series of sampled data (e.g., a camera feed) to the biometric recognition module 597.

The IMU(s) 584 may include a gyroscope, an accelerometer, a magnetometer, or other inertial measurement device. The fingerprint sensor(s) 587 can include any number of sensor devices configured and/or programmed to obtain fingerprint information. The fingerprint sensor(s) 587 and/or the IMU(s) 584 may also be integrated with and/or communicate with a passive key device, such as, for example, the mobile device 120 and/or the fob 179. The fingerprint sensor(s) 587 and/or the IMU(s) 584 may also (or alternatively) be disposed on a vehicle exterior space such as the engine compartment (not shown in FIG. 5), door panel (not shown in FIG. 5), etc. In other aspects, when included with the internal sensory system 583, the IMU(s) 584 may be integrated in one or more modules disposed within the vehicle cabin or on another vehicle interior surface.

The biometric recognition module 597 may be disposed in communication with one or more facial recognition exterior feedback displays 590, which can operate as a user interface accessible to the user 140 outside of the vehicle 105 to provide facial recognition feedback information 569 associated with facial recognition processes described herein. The biometric recognition module 597 may further connect with one or more fingerprint exterior feedback displays 592 that may perform similar communication functions associated with fingerprint recognition processes described herein, including providing fingerprint authentication feedback information 571 to the fingerprint exterior feedback displays 592 accessible to the user 140 outside of the vehicle 105 (also referred to in conjunction with the fingerprint exterior feedback display 592 as "feedback displays"). It should be appreciated that the feedback displays 590 and/or 592 may be and/or include a stationary I/O or other display disposed on the vehicle, the mobile device 120, the fob 179, and/or some other wired or wireless device.

The BANCC 187 can include an authentication manager 517, a personal profile manager 519, a command and control module 521, an authorization manager 523, an occupant manager 525, and a power manager 527, among other control components.

The authentication manager 517 may communicate biometric key information 554 to the DAC199. The biometric key information can include biometric mode updates indicative of a particular modality with which the internal and/or external sensory systems 583 and 581 are to obtain sensory data. The biometric key information 554 may further include an acknowledgement of communication received from the biometric recognition module 597, an authentication status update including, for example, biometric indices associated with user biometric data, secured channel information, biometric location information, and/or other information. In some aspects, the authentication manager 517 may receive biometric key administration requests 556 and other responsive messages from the biometric recognition module 597, which can include, for example, biometric mode message responses and/or other acknowledgements.

The authentication manager 517 may further connect with the TCU 160 and communicate biometric status payload information 541 to the TCU 160 indicative of the biometric authentication status of the user 140, requests for key information, profile data, and other information. The TCU 160 may send and/or forward digital key payload 591 to the server(s) 170 via the network(s) 125, and receive digital key status payload 593 from the server(s) 170 and provide responsive messages and/or commands to the authentication manager 517 that can include biometric information payload 543.

Moreover, the authentication manager 517 may be disposed in communication with the BLEM 195, and/or other the other vehicle controllers and systems 501 according to embodiments described in the present disclosure. For example, the BLEM 195 may send a PaaK wakeup message, or another initiating signal indicating that one or more components should transition from a low-power mode to a ready mode.

The authentication manager 517 may also connect with the personal profile manager 519, and the power manager 527. The personal profile manager 519 may perform data management associated with user profiles, which may be stored in the automotive computer 145 and/or stored on the server(s) 170. For example, the authentication manager 517 may send occupant seat position information 529 to the personal profile manager 519, which may include a seat position index (not shown in FIG. 5) indicative of preferred and/or assigned seating for passengers of the vehicle 105. The personal profile manager 519 may update seating indices, delete and create profiles, and perform other administrative duties associated with individualized user profile management.

The power manager 527 may receive power control commands 545 from the authentication manager 517, where the power control commands are associated with biometric authentication device management including, for example, device wakeup causing the biometric recognition module 597 and/or the DAC 199 to transition from a low power (standby mode) state to a higher power (e.g., active mode) state. The power manager 527 may send power control acknowledgements 551 to the authentication manager 517 responsive to the control commands 545. For example, responsive to the power and control commands 545 received from the authentication manager 517, the power manager 527 may generate a power control signal 565 and send the power control signal to the biometric recognition module. The power control signal 565 that may cause the biometric recognition module to change power states (e.g., wakeup, etc.). The biometric recognition module 597 may send a power control signal response 567 to the power manager 527 indicative of completion of the power control signal 565.

The authentication manager 517 and/or the personal profile manager 519 may further connect with the command and control module 521, which may be configured and/or programmed to manage user permission levels, and control vehicle access interface(s) (not shown in FIG. 5) for interfacing with vehicle users. The command and control module 521 may be and/or include, for example, the BCM 193 described with respect to FIG. 1. For example, the authentication manager 517 may send command and control authentication information 531 that cause the command and control module 521 to actuate one or more devices according to successful or unsuccessful authentication of a device, a signal, a user, etc. The command and control module 521 may send acknowledgements 533 and other information including, for example, vehicle lock status.

The occupant manager 525 may connect with the authentication manager 517, and communicate occupant change information 557 indicative of occupant changes in the vehicle 105. For example, when occupants enter and exit the vehicle 105, the occupant manager 525 may update an occupant index (not shown in FIG. 5), and transmit the occupant index as part of the occupant change information 557 to the authentication manager. The occupant manager 525 may further connect with the occupant manager 536 to update the occupant manager 525 with seat indices 559, which may include confirmation messages for seat index changes, and occupant entries and exits from the vehicle 105.

The occupant manager 525 may also receive seat indices 559 from the authentication manager 517, which may index seating arrangements, positions, preferences, and other information.

The occupant manager 525 may also connect with the command and control module 521. The command and control module 521 may receive adaptive vehicle control information 539 from the occupant manager 525, which may communicate and/or include settings for vehicle media settings, seat control information, occupant device identifiers, and other information.

The occupant manager 525 may be disposed in communication with the DAC 199, and may communicate biometric mode update information 561 to the biometric recognition module 597, which may include instructions and commands for utilizing particular modalities of biometric data collection from the internal sensory system 583 and/or the external sensory system 581. The occupant manager 525 may further receive occupant status update information and/or occupant appearance update information (collectively shown as information 563 in FIG. 5) from the biometric recognition module 597.

Figure 6:
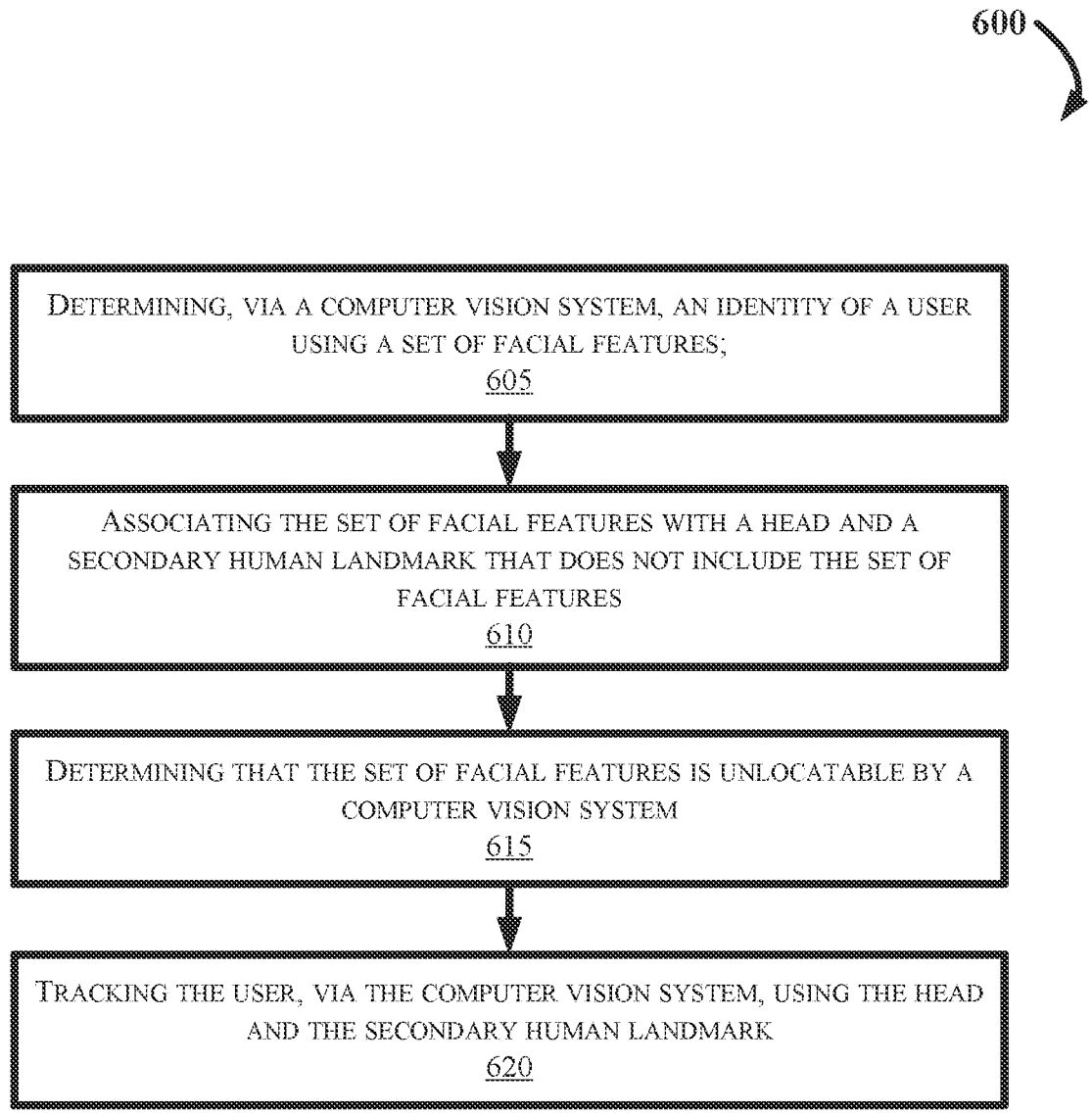
FIG. 6 depicts a flow diagram in accordance with the present disclosure.

FIG. 6 is a flow diagram of an example method 600 for maintaining tracking using non-identifiable biometrics, according to the present disclosure. FIG. 6 may be described with continued reference to prior figures, including FIGS. 1-5. The following process is exemplary and not confined to the steps described hereafter. Moreover, alternative embodiments may include more or less steps than are shown or described herein, and may include these steps in a different order than the order described in the following example embodiments.

Referring first to FIG. 6, at step 605, the method 600 may commence with determining, via a computer vision system, an identity of a user using a set of facial features. This step may include storing, in a computer memory, a last sampled image comprising the set of facial features, and updating a human landmark tracking index with the last sampled image, a user identification (ID) indicative of the identity of the user, a frame location for the set of facial features in the last sampled image, and a frame location for the secondary human landmark.

At step 610, the method 600 may further include associating the set of facial features with a head and a secondary human landmark that does not include the set of facial features.

At step 615, the method 600 may further include features determining that the set of facial features is unlocatable by a computer vision system.

At step 620, the method 600 may further include tracking the user, via the computer vision system, using the head and the secondary human landmark. This step may further include activating a vehicle Welcome Message based on a location of the secondary human landmark in an image frame.

The method may further include determining that the set of facial features is locatable by the computer vision system, reauthenticating the identity of the user using the set of facial features, and providing entry to a vehicle responsive to the reauthentication.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for maintaining user movement tracking using non-identifiable biometrics, comprising:
   determining, via a computer vision system, an identity of a user using a set of facial features, wherein determining the identity of the user comprises:
      storing, in a computer memory, a last sampled image comprising the set of facial features; and
      updating, with the last sampled image, a human landmark tracking index comprising:
         a user identification (ID) indicative of the identity of the user;
         a frame location for the set of facial features in the last sampled image; and
         a frame location for a secondary human landmark;
   associating the set of facial features with a head and the secondary human landmark that does not include the set of facial features;
   determining that the set of facial features is unlocatable by the computer vision system; and
   tracking the user, via the computer vision system, using the head and the secondary human landmark that does not include the set of facial features.

2. The method according to claim 1, further comprising:
   activating a vehicle welcome message based on a location of the secondary human landmark in an image frame.

3. The method according to claim 1, further comprising:
   determining that the set of facial features is locatable by the computer vision system;
   reauthenticating the identity of the user using the set of facial features; and
   providing entry to a vehicle responsive to the reauthentication.

4. The method according to claim 1, further comprising:
   determining a gait of the user; and
   triggering a vehicle lock disposed on a vehicle to actuate to a locked state or an unlocked state based on the gait.

5. The method according to claim 4, further comprising:
   determining, based on the gait, that the user is walking away from the vehicle; and
   responsive to determining that the user is walking away from the vehicle based on the gait, triggering the vehicle lock to actuate to the locked state.

6. The method according to claim 1, wherein determining the identity of the user using the set of facial features further comprises face tracking by searching only a local region of interest by downsampling.

7. The method according to claim 1, wherein the secondary human landmark comprises at least one of:
   a visible body part other than the head;
   an item of clothing;
   a mark on the item of clothing; or
   a package carried by the user.

8. A biometric recognition module, comprising:
   a computer vision system;
   a processor disposed in communication with the computer vision system; and
   a memory for storing executable instructions, the processor programmed to execute the instructions to:
      determine an identity of a user using a set of facial features, wherein the determination of the identity of the user using the set of facial features comprises:
         storing, in a computer memory, a last sampled image comprising the set of facial features; and
         update, with the last sampled image, a human landmark tracking index comprising:
            a user identification (ID) indicative of the identity of the user;
            a frame location for the set of facial features in the last sampled image; and
            a frame location for a secondary human landmark;
      associate the set of facial features with a head and the secondary human landmark that does not include the set of facial features;
      determine that the set of facial features is unlocatable by the computer vision system; and
      track the user, via the computer vision system, using the head and the secondary human landmark that does not include the set of facial features.

9. The biometric recognition module according to claim 8, wherein the processor is further programmed to execute the instructions to:
   activate a vehicle welcome message based on a location of the secondary human landmark in an image frame.

10. The biometric recognition module according to claim 8, wherein the processor is further programmed to execute the instructions to:
   determine that the set of facial features is locatable by the computer vision system;

reauthenticate the identity of the user using the set of facial features; and provide entry to a vehicle responsive to the reauthentication.

11. The biometric recognition module according to claim 8, wherein the processor is further programmed to execute the instructions to:

determine a gait of the user; and trigger a vehicle lock disposed on a vehicle to actuate to a locked state or an unlocked state based on the gait.

12. The biometric recognition module according to claim 11, wherein the processor is further programmed to execute the instructions to:

determine, based on the gait, that the user is walking away from the vehicle; and responsive to determining that the user is walking away from the vehicle based on the gait, trigger the vehicle lock to actuate to the locked state.

13. The biometric recognition module according to claim 8, wherein the secondary human landmark comprises at least one of:

a visible body part other than the head;

an item of clothing;

a mark on the item of clothing; or a package carried by the user.

14. A non-transitory computer-readable storage medium in a vehicle controller, the computer-readable storage medium having instructions stored thereupon which, when executed by a processor, cause the processor to:

determine an identity of a user using a set of facial features;

store, in a computer memory, a last sampled image comprising the set of facial features; and update, with the last sampled image, a human landmark tracking index comprising:

a user identification (ID) indicative of the identity of the user;

a frame location for the set of facial features in the last sampled image; and a frame location for a secondary human landmark;

associate the set of facial features with a head and a secondary human landmark that does not include the set of facial features;

determine that the set of facial features is unlocatable by a computer vision system; and track the user, via the computer vision system, using the head and the secondary human landmark that does not include the set of facial features.

15. The non-transitory computer-readable storage medium according to claim 14, having further instructions stored thereupon to:

activate a vehicle welcome message based on a location of the secondary human landmark in an image frame.

16. The non-transitory computer-readable storage medium according to claim 14, having further instructions stored thereupon to:

determine the set of facial features is locatable by the computer vision system;

reauthenticate the identity of the user using the set of facial features; and provide entry to a vehicle responsive to the reauthentication.

17. The non-transitory computer-readable storage medium according to claim 14, having further instructions stored thereupon to:

determine a gait of the user; and trigger a vehicle lock to actuate to a locked state or an unlocked state based on the gait.

* * * * *